United States Patent [19]

Helmrich

[11] 4,277,810
[45] Jul. 7, 1981

[54] FLOPPY DISC STRUCTURE WITH RECTANGULAR CASING

[75] Inventor: Hans Helmrich, Geisenbrunn, Fed. Rep. of Germany

[73] Assignee: Siemens Aktiengesellschaft, Berlin & Munich, Fed. Rep. of Germany

[21] Appl. No.: 12,381

[22] Filed: Feb. 15, 1979

[30] Foreign Application Priority Data

Mar. 22, 1978 [DE] Fed. Rep. of Germany ... 7808788[U]

[51] Int. Cl.³ .................. G11B 23/02; G11B 25/04
[52] U.S. Cl. .................................. 360/133; 206/444; 360/97
[58] Field of Search .................. 360/133, 97–99; 206/444; 346/137

[56] References Cited

U.S. PATENT DOCUMENTS

| | | | |
|---|---|---|---|
| 3,668,658 | 6/1972 | Flores | 360/133 |
| 3,931,644 | 1/1976 | Ward | 360/133 |
| 4,152,740 | 5/1979 | Stratton | 360/133 |

*Primary Examiner*—Alfred H. Eddleman
*Attorney, Agent, or Firm*—Hill, Van Santen, Steadman, Chiara & Simpson

[57] ABSTRACT

A floppy disc structure comprises a magnetic disc which is rotatably disposed in a rectangular casing. At points where a gripping arrangement grasps the floppy disc in order to draw the same into a floppy disc drive unit automatically, spacers are provided which prevent compression of the casing, the spacers being disposed between the inner surfaces of the walls of the casing. The spacers are approximately the thickness of the magnetic disc.

4 Claims, 3 Drawing Figures

FLOPPY DISC STRUCTURE WITH RECTANGULAR CASING

BACKGROUND OF THE INVENTION

1. Field of the Invention

The present invention relates to a floppy disc structure which includes a magnetic disc which is disposed in a rectangular, preferably square, casing and which is suitable for automatic loading into a floppy disc drive unit by means of a gripping arrangement that grasps the casing.

2. Description of the Prior Art

A floppy disc is usually constitued by a flexible magnetic disc that is disposed, rotatably, in a square casing.

A drive unit for floppy discs have been proposed in which the floppy disc is loaded automatically. The floppy disc drive unit has a gripping arrangement that grasps the casing of the floppy disc outside of the area in which the magnetic disc rotates and draws the same into the floppy disc unit through the utilization of a motor. The gripping arrangement can be provided with spring gripping elements having internal faces which are covered with felt. For loading, the floppy disc is partially inserted in the floppy disc drive unit and the gripping elements grasp the floppy disc, advantageously at the corners of the inserted portion of the structure.

However, there is a risk that the casing will be compressed when the floppy disc structure is grasped, such that the ability of the magnetic disc to rotate in the casing with at least possible friction is impaired.

SUMMARY OF THE INVENTION

Consequently, the object of the present invention is to provide a floppy disc structure in which compression of the casing is prevented when the floppy disc is grasped by a gripping arrangement for automatic loading into a floppy disc drive unit.

According to the present invention, the above object is achieved in that the floppy disc casing is provided with two parallel walls in which spaces are provided between the internal surfaces of the walls, outside of the area occupied by the magnetic disc, and at least in the places for positions which are grasped by the gripping arrangement.

A floppy disc structure constructed in accordance with the present invention has the advantage that the ability of the magnetic disc to rotate with minimal friction within the casing is preserved, even when the floppy disc structure is automatically loaded into a floppy disc drive unit with the aid of a gripping arrangement. Contact between the gripping arrangement and the floppy disc structure must not be broken while the floppy disc is being used.

In order to make the floppy disc rotatable with adequate reduced friction, it is advantageous if the spacers are approximately the same thickness as the magnetic disc.

One particularly advantageous embodiment of a floppy disc structure provides the spacers at the corners of the casing. In this embodiment, the gripping arrangement grasps the floppy disc casing at a relatively long distance from the area in which the magnetic disc rotates. In addition, the corners of the floppy disc structure are fitted with the spacers and are thus supported with better protection with respect to damage.

The production of the floppy disc structure and the spacers becomes particularly simple if the spacers disposed at the corners or are triangular in shape.

Should the walls of the floppy disc casing be connected together by means of folds which, in each case, are portions of one wall and engage over the other wall, the floppy disc structure can be made in an advantageous manner without utilizing more material when the spacers are constituted by parts of at least one of the folds disposed between the inter surfaces of the casing at points to be grasped.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
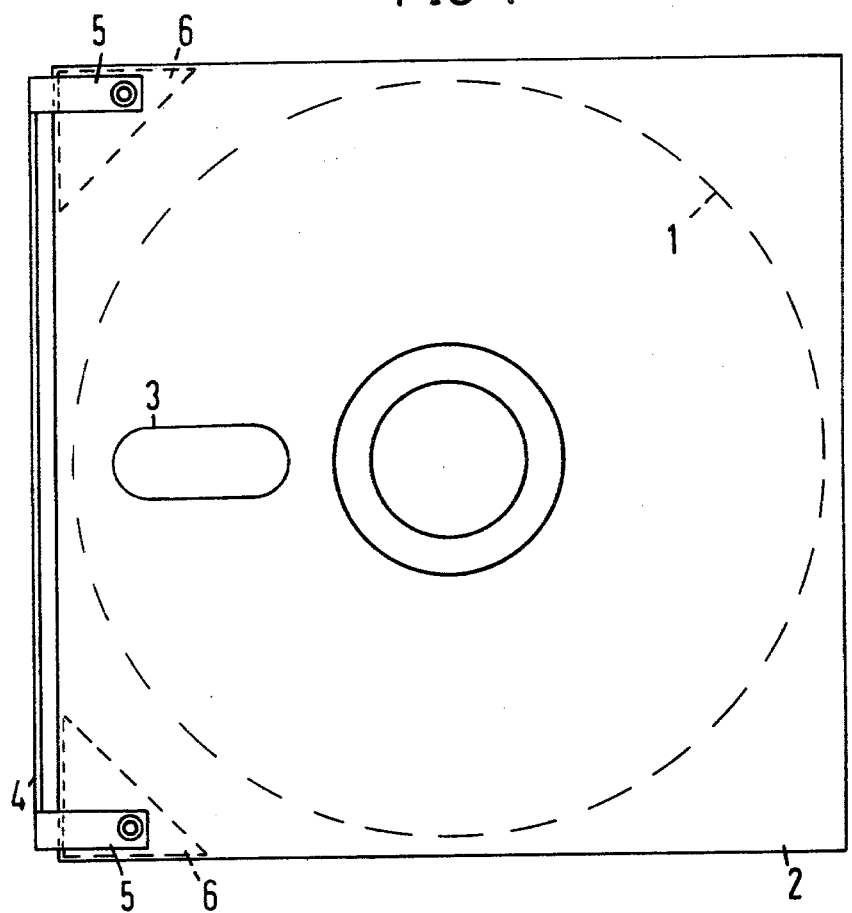
FIG. 1 is a plan view of a floppy disc structure constructed in accordance with the present invention.

The floppy disc structure illustrated in FIG. 1 comprises a magnetic disc 1 which is provided with a central opening and which is disposed, rotatably, in a rectangular, preferably square, casing 2. The casing 2 comprises paper-like material or plastic. It also exhibits a central opening which is larger than the central opening in the magnetic disc 1. In addition, the casing has an elongated opening 3 through which a positionable magnetic head comes into contact with the magnetic disc 1.

When the floppy disc structure is employed in a floppy disc drive unit equipped with an automatic loading device, the floppy disc is initially partially inserted in the floppy disc drive unit by hand. The floppy disc drive unit is provided with a gripping arrangement which grasps the casing 2 of the floppy disc structure and draws the floppy disc into the floppy disc drive unit with the aid of a motor, for example the positioning motor for the magnetic head. The gripping arrangement has a slide 4 on which gripping elements 5 for the floppy disc structure are disposed. The gripping elements 5 are sprung and receive the floppy disc structure when it is inserted by hand. The insides of the gripping elements can be covered with a friction lining, such as felt.

In order not to impair the ability of the magnetic disc 1 to rotate with the least possible friction within the casing 2 when the gripping elements 5 grasp and compress the casing 2 of the flopping disc structure, spacer 6 are disposed between the inner surface of the walls of the casing 2 at those points of the flopping disc structure that lie outside of the space in which the magnetic disc 1 rotates and at which the gripping elements 5 grasp the casing 2. The spacers 6 are made of card or plastic, for example, and are preferably at least as thick as the magnetic disc 1. The spacer 6 can be triangular in shape when they are disposed at the corners of the casing 2. They may also be round or rectangular in shape. The triangular shape can also be modified such that the diagonal of the triangle is parallel with the edge of the magnetic disc, that is arcuate in shape.

When the gripping element 4, 5 grasps the casing 2 at the points where the spacers 6 are provided, compression of the casing 2 is avoid and the ability of the magnetic disc 1 to rotate within the casing 2 is not impaired, which results in the magnetic disc 1 having a long service life.

Figure 2:
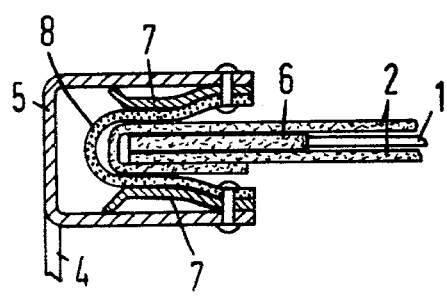
FIG. 2 is a partial sectional view taken through the floppy disc illustrated in FIG. 1.

The sectional view illustrated in FIG. 2 provides a considerably enlarged section through the floppy disc structure with a gripping element 5 and parallel with the edge of the casing 2.

The magnetic disc 1 is disposed rotatably within the casing 2. The spacers 6, which are at least as thick as the magnetic disc 1, are fixed between the internal surfaces of the walls of the casing 2. The casing 2 is grasped by the gripping element 5 at the points where the spacers 6 are disposed. The gripping element 5 is fixed to a slide 4 of which only a portion is shown. Springs 7 which press against the casing 2 are fixed to the insides of the gripping element 5. In order to increase the friction between the springs 7 and the casing 2, the insides of the springs 7 are lined with felt, as indicated at 8.

Figure 3:
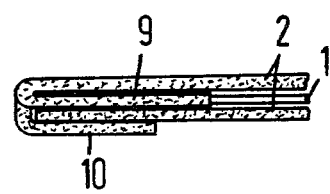
FIG. 3 is a partial sectional view through another floppy disc structure constructed in accordance with the principles of the present invention.

In the case of a floppy disc illustrated in FIG. 3, the walls of the casing 2 are connected together by folds which, in each case, form part of one wall and engage over the other wall. In this floppy disc structure, the spacers are made in a particularly simple manner in that the portions 9 of at least one fold are disposed between the internal walls of the casing 2 at the points to be grasped. In the middle of the edges of the casing 2, in particular in the area in which the magnetic disc 1 rotates, a portion 10 of the fold is disposed, in a manner known per se, so as to engage over one wall of the casing 2. In this manner, a floppy disc structure is provided with spacers which can be produced without using any extra material.

Although I have described my reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A floppy disc structure to be gripped by a pair of spaced grippers of a gripping arrangement of a floppy disc drive unit for drawing the floppy disc structure into the floppy disc drive unit, comprising:
   a rectangular casing for loading into a floppy disc drive unit, said casing including a pair of spaced walls;
   a floppy disc rotatably mounted in said casing between said pair of spaced walls; and
   spacing means between said walls only at gripping locations of the spaced grippers of the gripping arrangement at two adjacent corners of said casing and outside of the space occupied by said floppy disc, said spacing means having a thickness which is approximately the same as that of said floppy disc.

2. The structure of claim 1, wherein said spacing means comprises:
   a pair of triangular-shaped members located at respective ones of and conforming to the shape of said two corners.

3. The structure of claim 1, wherein:
   one of said walls includes a U-shaped extension which extends about an edge of the other of said walls.

4. The structure of claim 1, wherein:
   one of said walls includes a first U-shaped portion with one leg of said U forming said spacing means; and
   a second U-shaped portion extending such that one leg thereof embraces the other of said walls.

* * * * *